United States Patent
Klein (10) Patent No.: US 9,519,434 B2
(45) Date of Patent: Dec. 13, 2016

(54) RAID DEVICES, SYSTEMS, AND METHODS

(71) Applicant: DHK Storage, LLC, Herndon, VA (US)

(72) Inventor: David Harry Klein, Sterling, VA (US)

(73) Assignee: DHK Storage, LLC, Herndon, VA (US)

( * ) Notice: Subject to any disclaimer, the term of this patent is extended or adjusted under 35 U.S.C. 154(b) by 3 days.

(21) Appl. No.: 14/816,541

(22) Filed: Aug. 3, 2015

(65) Prior Publication Data

US 2015/0339072 A1 Nov. 26, 2015

Related U.S. Application Data

(62) Division of application No. 12/851,870, filed on Aug. 6, 2010, now Pat. No. 9,134,771.

(51) Int. Cl.
*G06F 3/06* (2006.01)
*G06F 1/18* (2006.01)

(52) U.S. Cl.
CPC ............ *G06F 3/0619* (2013.01); *G06F 1/187* (2013.01); *G06F 3/0665* (2013.01); *G06F 3/0689* (2013.01)

(58) Field of Classification Search
CPC ...... G06F 3/0619; G06F 1/187; G06F 3/0665; G06F 3/0689
USPC .............. 711/114, 154, 156, 170; 369/13.03; 709/222; 710/262; 713/1, 2
See application file for complete search history.

(56) References Cited

U.S. PATENT DOCUMENTS

| | | | | |
|---|---|---|---|---|
| 5,332,306 A * | 7/1994 | Babb | ............... | H05K 7/1418 312/223.1 |
| 5,396,617 A * | 3/1995 | Villwock | ............. | G06F 3/0601 710/62 |
| 5,560,572 A * | 10/1996 | Osborn | ............... | H05K 7/1421 248/201 |
| 5,682,291 A * | 10/1997 | Jeffries | ................... | G06F 1/184 312/223.2 |
| 6,075,694 A * | 6/2000 | Mills | ................... | H05K 7/1424 312/223.2 |
| 6,115,242 A * | 9/2000 | Lambrecht | ............. | G06F 1/183 257/686 |
| 6,392,892 B1 * | 5/2002 | Sobolewski | .......... | G11B 5/584 248/634 |
| 6,442,022 B1 * | 8/2002 | Paul | ..................... | G11B 33/122 361/679.33 |
| 6,920,042 B2 * | 7/2005 | Yuan | ...................... | G06F 1/187 361/679.33 |
| 7,185,020 B2 * | 2/2007 | Bhatti | ................ | G06F 12/1027 |
| 7,212,411 B2 * | 5/2007 | Williams | ................ | G06F 1/184 174/50.54 |
| 7,315,911 B2 * | 1/2008 | Davies | ................ | G06F 11/2089 710/260 |
| 7,362,565 B2 * | 4/2008 | Imblum | .................. | G06F 1/184 361/679.33 |
| 7,394,660 B2 * | 7/2008 | Hidaka | ................ | G11B 33/126 361/724 |
| 7,460,375 B2 * | 12/2008 | Randall | ............... | H05K 7/1492 361/724 |

(Continued)

*Primary Examiner* — Stephen Elmore
(74) *Attorney, Agent, or Firm* — Clayton, McKay & Bailey, PC (57) ABSTRACT

The invention is directed to a storage device utilizing laptop storage drives and rackmount server adapted to use the same. The storage device includes a body and drive software. The drive and internal portions of the body are adapted to form contact fits. The software of the storage device provides an electronic interface that permits operations of advantageous RAID configurations.

20 Claims, 7 Drawing Sheets

(56) References Cited

U.S. PATENT DOCUMENTS

| | | | | |
|---|---|---|---|---|
| 8,214,630 B2* | 7/2012 | Peterka | ............ | G01R 31/31719 |
| | | | | 713/1 |
| 2002/0144044 A1* | 10/2002 | Moon | .................... | G06F 3/0607 |
| | | | | 710/302 |
| 2004/0246674 A1* | 12/2004 | Chen | ........................ | G06F 1/187 |
| | | | | 361/679.31 |
| 2005/0094369 A1* | 5/2005 | Chen | ........................ | G06F 1/184 |
| | | | | 361/679.31 |
| 2005/0157464 A1* | 7/2005 | McAlister | ............... | G06F 1/187 |
| | | | | 361/679.33 |
| 2005/0219826 A1* | 10/2005 | Carlson | ................ | G11B 33/128 |
| | | | | 361/724 |
| 2006/0012950 A1* | 1/2006 | Shih | ........................ | G06F 1/184 |
| | | | | 361/679.33 |
| 2006/0050487 A1* | 3/2006 | Wu | ........................ | G06F 1/184 |
| | | | | 361/724 |
| 2006/0227502 A1* | 10/2006 | Cheng | ..................... | G06F 1/187 |
| | | | | 361/679.39 |
| 2007/0053169 A1* | 3/2007 | Carlson | .................. | G11B 33/12 |
| | | | | 361/727 |
| 2007/0076366 A1* | 4/2007 | Makabe | .................. | G06F 1/185 |
| | | | | 361/679.39 |
| 2007/0127204 A1* | 6/2007 | Muenzer | ................. | G06F 1/181 |
| | | | | 361/679.58 |
| 2007/0247802 A1* | 10/2007 | Imsand | ................... | G06F 1/181 |
| | | | | 361/679.39 |
| 2008/0037209 A1* | 2/2008 | Niazi | ...................... | G06F 1/181 |
| | | | | 361/727 |
| 2008/0080129 A1* | 4/2008 | Morris | .................... | G06F 1/187 |
| | | | | 361/679.33 |
| 2009/0257187 A1* | 10/2009 | Mills | ................. | H05K 7/20727 |
| | | | | 361/679.33 |

* cited by examiner

RAID DEVICES, SYSTEMS, AND METHODS

CROSS-REFERENCE TO RELATED APPLICATIONS

This application claims priority as a divisional application from U.S. patent application Ser. No. 12/851,870, now U.S. Pat. No. 9,134,771, to David Harry Klein, filed Aug. 6, 2010, titled RAID DEVICES, SYSTEMS, AND METHODS the entire disclosure of which is hereby incorporated by reference.

FIELD OF THE INVENTION

The present invention relates to the field of variable electronic storage systems and more specifically to the field of Redundant Arrays of Independent Disks systems.

BACKGROUND

It is known how to store data in an array of disks managed by an array controller to control the storage and retrieval of data from the array is known. One example of such a system is a Redundant Array of Independent Disks (RAID) comprising a collection of multiple disks organized into a disk array managed by a common array controller. The array controller presents the array to the user as one or more virtual disks. Disk arrays are the framework to which RAID functionality is added in functional levels to produce cost-effective, high-performance disk systems having varying degrees of reliability based on the type of RAID architecture implemented. RAID architecture can be conceptualized in two dimensions as individual disks arranged in adjacent columns. Typically, each disk is partitioned with several identically sized data partitions known as stripes, or minor stripes. Distributed across the array of disks in rows, the identically sized partitioned strips form a data stripe across the entire array of disks. Therefore, the array contains stripes of data distributed as rows in the array, wherein each disk is partitioned into stripes of identically partitioned data and only one strip of data is associated with each stripe in the array.

As is known, RAID architectures have been standardized into several categories. RAID level 0 is a performance-oriented striped data mapping technique incorporating uniformly sized blocks of storage assigned in a regular sequence to all of the disks in the array. RAID level 1, also called mirroring, provides simplicity and a high level of data availability, but at a relatively high cost due to the redundancy of the disks. RAID level 3 adds redundant information in the form of parity data to a parallel accessed striped array, permitting regeneration and rebuilding of lost data in the event of a single-disk failure. RAID level 4 uses parity concentrated on a single disk to allow error correction in the event of a single disk failure, but the member disks in a RAID 4 array are independently accessible. In a RAID 5 implementation, parity data is distributed across some or all of the member disks in the array. The RAID 5 architecture achieves performance by striping data blocks among N disks, and achieves fault-tolerance by using 1/N of its storage for parity blocks, calculated by taking the exclusive-or (XOR) of all data blocks in the parity disks row. A RAID 6 architecture is similar to RAID 5, but RAID 6 can overcome the failure of any two disks by using an additional parity block for each row (for a storage loss of 2/N). In one example of a RAID 6 architecture, the first parity block (P) is calculated with XOR of the data blocks. The second parity block (Q) employs Reed-Solomon codes. One drawback of the known RAID 6 implementation is that it requires a complex and computationally time-consuming array controller to implement the Reed-Solomon codes necessary to recover from a two-disk failure. The complexity of Reed-Solomon codes may preclude the use of such codes in software, or may necessitate the use of expensive special purpose hardware. Thus, implementation of Reed-Solomon codes in a disk array increases the cost, complexity, and processing time of the array.

SUMMARY

The invention is directed to a storage device having a body, drive software, and an interface. The body includes at least two interior drive slots with an internal support member. Multiple laptop storage drives having a girth of less than 2.5 includes fit within each slot. The drives include an external drive fit member adapted to form a contact fit relationship with the internal support member. The body includes a drive door for each drive adapted to fit within the body. The software provides an electronic interface that permits operations of RAID 0, RAID 1, non-RAID, and combinations thereof. The body includes a physical interface that includes, and preferably consists of, a power indicator.

Another embodiment of the storage device includes a body with a single interior slot with at least four of the laptop storage drives of girth less than 2.5 inches in a storage drive array The drives include an external drive fit member adapted to form a contact fit relationship with the internal support member. The body includes a drive door for each drive adapted to fit within the body. The software provides an electronic interface that permits operations of RAID 0, RAID 1, RAID 5, and combinations thereof. The body includes a physical interface that includes, and preferably consists of, a power indicator.

The present invention further includes rackmount servers adapted to accept the storage devices, and a system that includes a computer in electronics communication with the storage devices directly or via a rackmount server.

These aspects of the invention are not meant to be exclusive. Furthermore, some features may apply to certain versions of the invention, but not others. Other features, aspects, and advantages of the present invention will be readily apparent to those of ordinary skill in the art when read in conjunction with the following description, and accompanying drawings.

DETAILED DESCRIPTION

Figure 1:
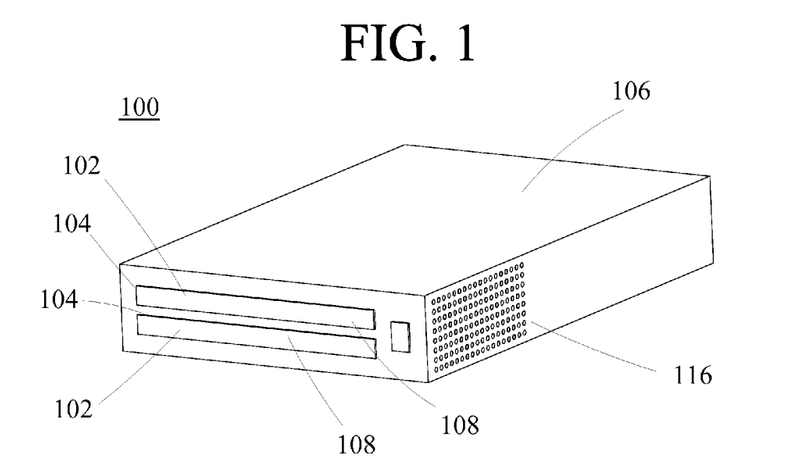
FIG. 1 is a perspective view of the device of the present invention.
Figure 5:
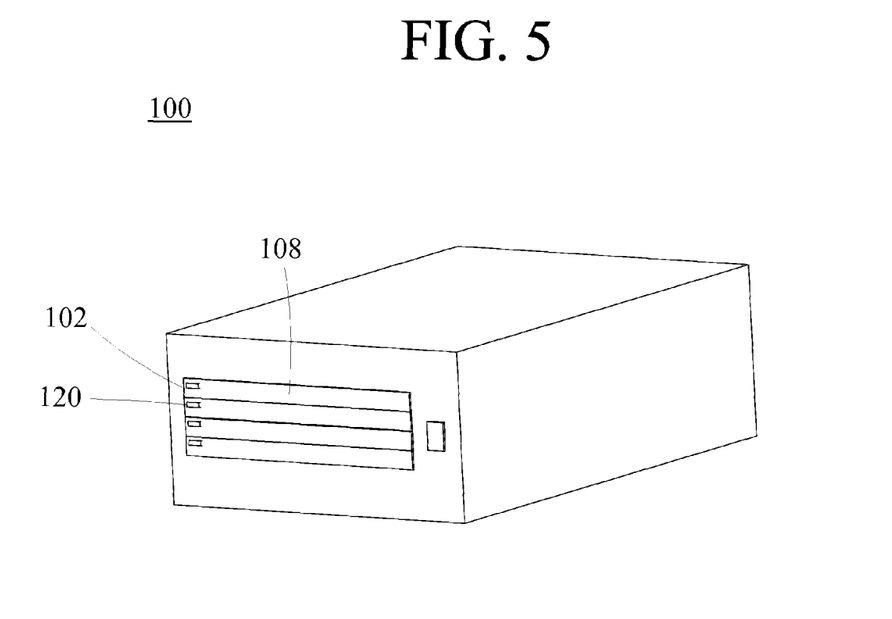
FIG. 5 is a perspective view of the device of the present invention.
Figure 8:
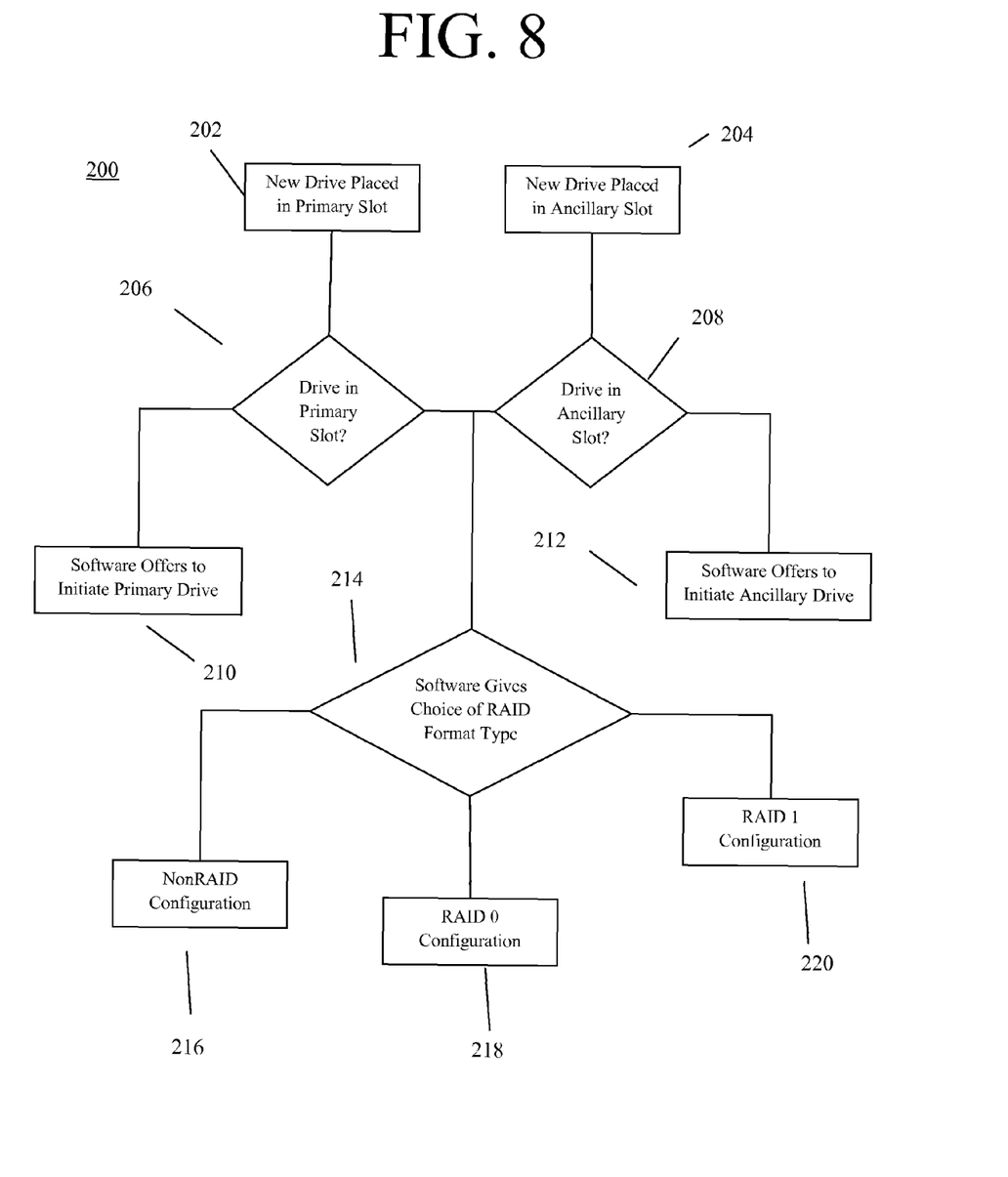
FIG. 8 is a view of the process of the present invention.
Figure 10A:
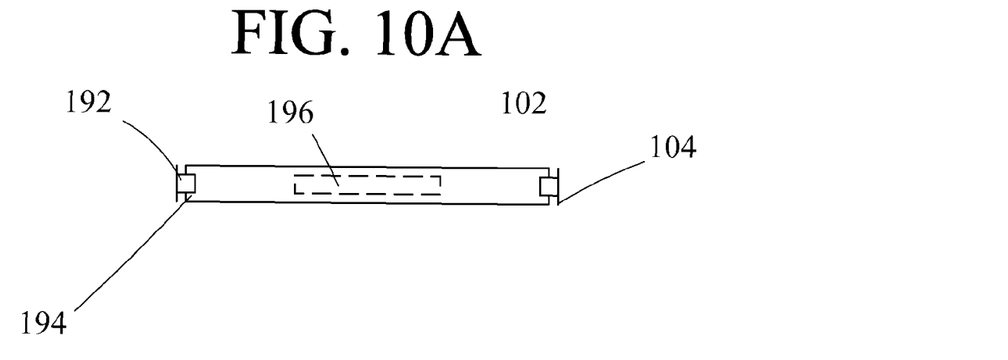
FIGS. 10A-10D are cutaway, partial views of the device of the present invention.
Figure 10B:
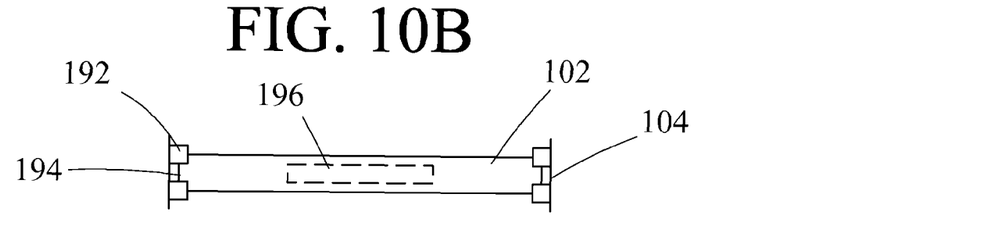
Figure 10C:
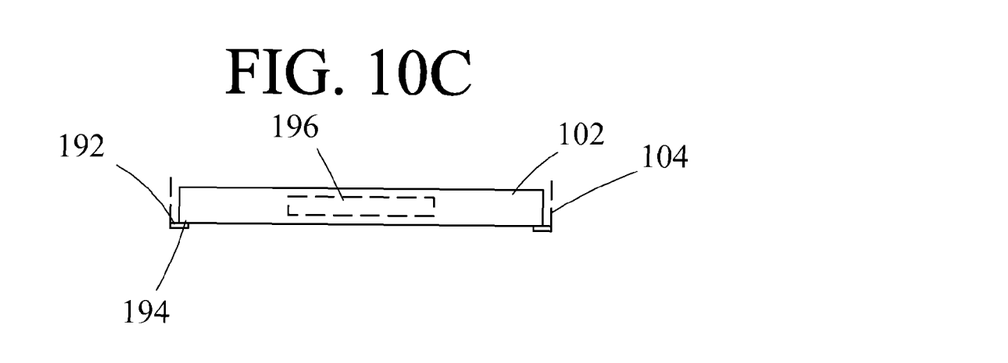
Figure 10D:
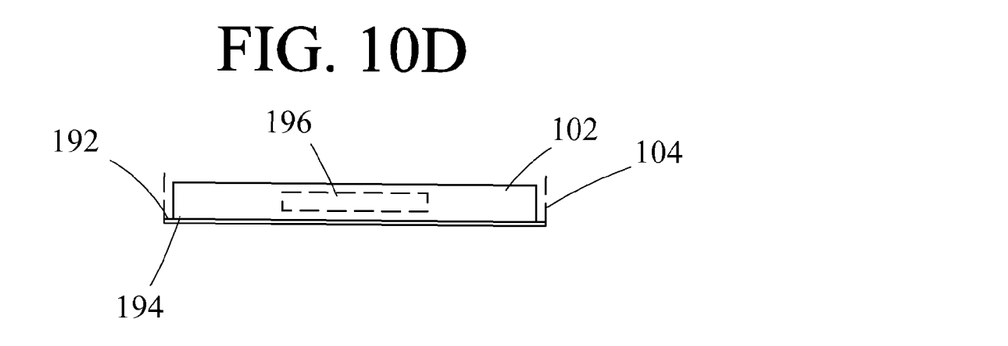

Referring first to FIG. 1 and FIG. 8, a basic embodiment of the storage device 100 and variable storage process 200 are shown. The device 100 preferable includes two or more 2.5" formatted SATA hard drives 102. The drives 102 are removably positioned within drive slots 104 dimensioned to accept the drives 102 within the device body 106. The drive slots 104 may occupy any position, but a preferred position places one drive on top of another as is shown by FIG. 5. Each slot, 104, can only accept one hard drive. It is preferred that the two slots 104 are separated by a thin sheet of metal as depicted in FIG. 10D. The preferred slot includes internal body fit members as support means. By body fit members, it is meant that rather than rely on quasi-permanent means of component attachment that requires actuating of distinct attachment accessories, e.g. bolts and screws, the present invention utilizes components that rely on contact to secure two components.

Turning now to FIGS. 10A-10D, the preferred body fit members 190 within the drive slots 104 include siderails or some other internal support means 192 that position the drive slot in a position proximate to the drive so as to provide fit support. The drive slot may include a single continuous opening that utilizes the body fit members to form any desired physical partitions. The internal body fit member of the device may include a body shelf, siderails, a door shelf, snaps, grooves, etc. The external drive fit members 194 may include a drive 102 with a body having dimensions to releasably mate with the internal body fit members of the device. The fittings may form a rest fit relationship such that the drive merely rests upon a body fit member. The fittings may form a close fit relationship, such that a close sizing between a portion of the drive or component thereof and the body slot or a component thereof forms a near fit. By near fit, it is meant that a distance between two components is highly minimized to a substantial degree dictated by the natural size tolerances between two components. The fittings may form an interference fit, such that one component includes a size adapted to require pressure to fit within a second component and upon fitting requires substantial pressure for removal. The fit members serve as a means of support in addition to the natural support provided by any internal data couplings 196 within the device body, e.g. eSATA ports. Returning to FIG. 1, a user need only open the slot door 108 to access the disk 102 for removal.

Figure 2:
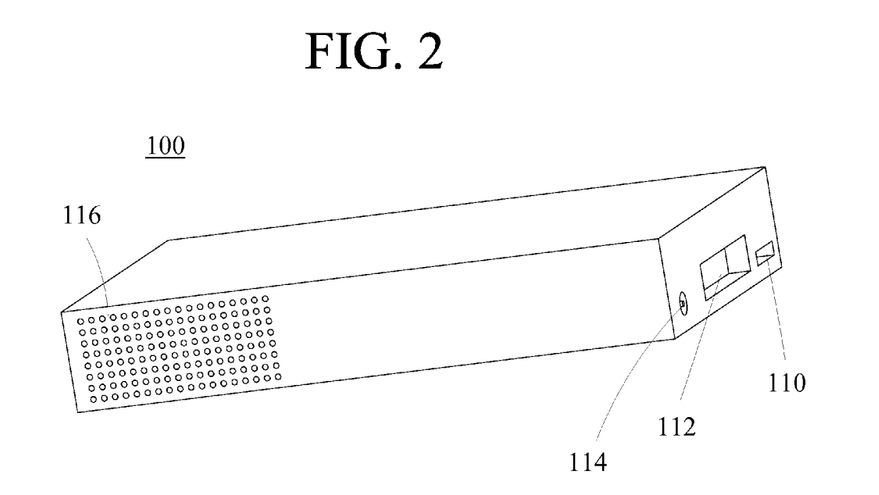
FIG. 2 is a perspective view of the device of the present invention.

Turning now to FIG. 2, there are preferably three connections, located on the rear of the body. The connections include two data connections, including a USB 2.0 port 110 and an eSATA 3.0 Gb/s port 112. When the device is used via the USB Port, the drives will not be capable of removal during operation; when the device is used with the eSATA port, the drives will be capable of removal during operation. Additionally, the device 100 includes a direct current port 114. The body 106 preferably includes venting 116 to permit the emission of heat.

Figure 9:
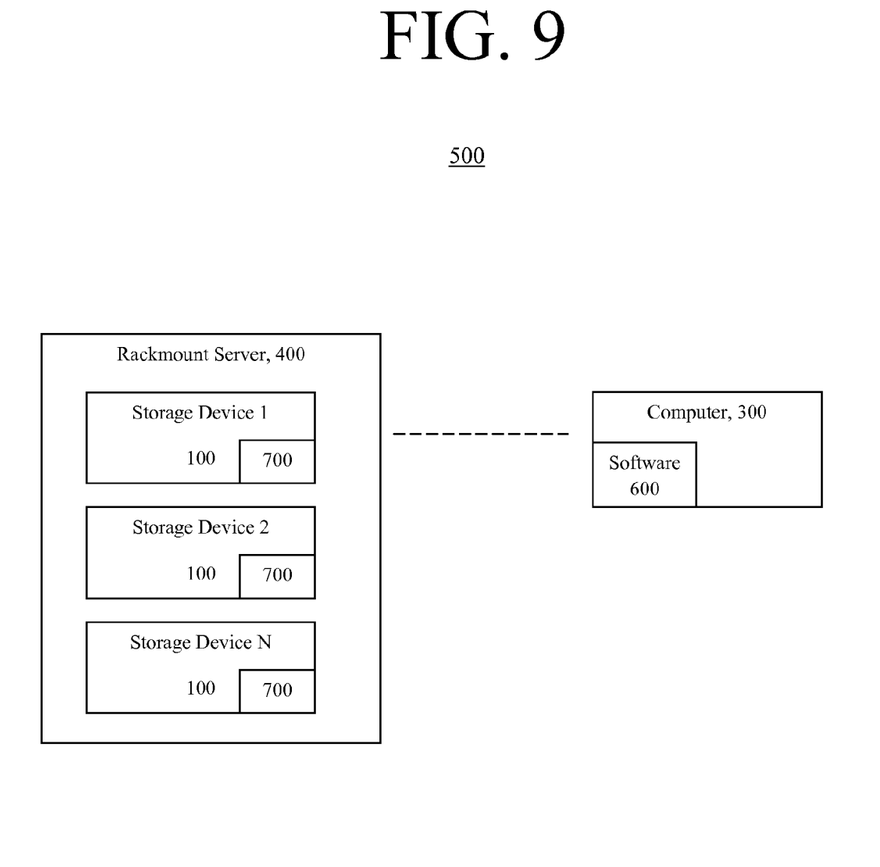
FIG. 9 is a view of the system of the present invention.

With reference to FIGS. 8 and 9, the setup and configuration of the system 500, which includes device(s) 100, the supporting computer 300 in communication with the device(s) 100, and potentially one or more rackmount servers bearing the devices 100 will by performed via software 600 loaded onto the computer 300 that connects to the device directly or through a rackmount server. The process 200 of the present invention includes recognition and configuration of the device. Upon insertion of a new hard drive in either the primary or ancillary slot, the device 100 will remain dormant 202, 204 and take no action. For the purposes of the present disclosure, the primary disk shall refer to the base drive positioned in the device, whereas the ancillary drive shall refer to any other number of drives described either by their relationship to either the primary drive or another ancillary drive. Each drive includes drive software 700 having a recognition token that includes two parameters: a recognition parameter identifies the drive as capable of use with the present invention, and an action parameter that includes an action request. The preferred action request includes instructions to remain dormant until instructions from the software are accepted. An alternative action request includes immediate configuration by the computer without user interaction. The recognition token is recognized by software within a computer adapted to seek the recognition token actively. The computer 300 informs the user of the existence of a new drive 206, 208 and requests an initiation action 210, 212 for the drive. Specifically, the computer provides a two-pronged decision to the user as to whether s/he would prefer operation of the device as a RAID 0 configuration 218, a RAID 1 configuration 220, or operate as a dual hard drive 216. Other forms of the present invention my present other raid options, such as RAID 5.

Figure 3:
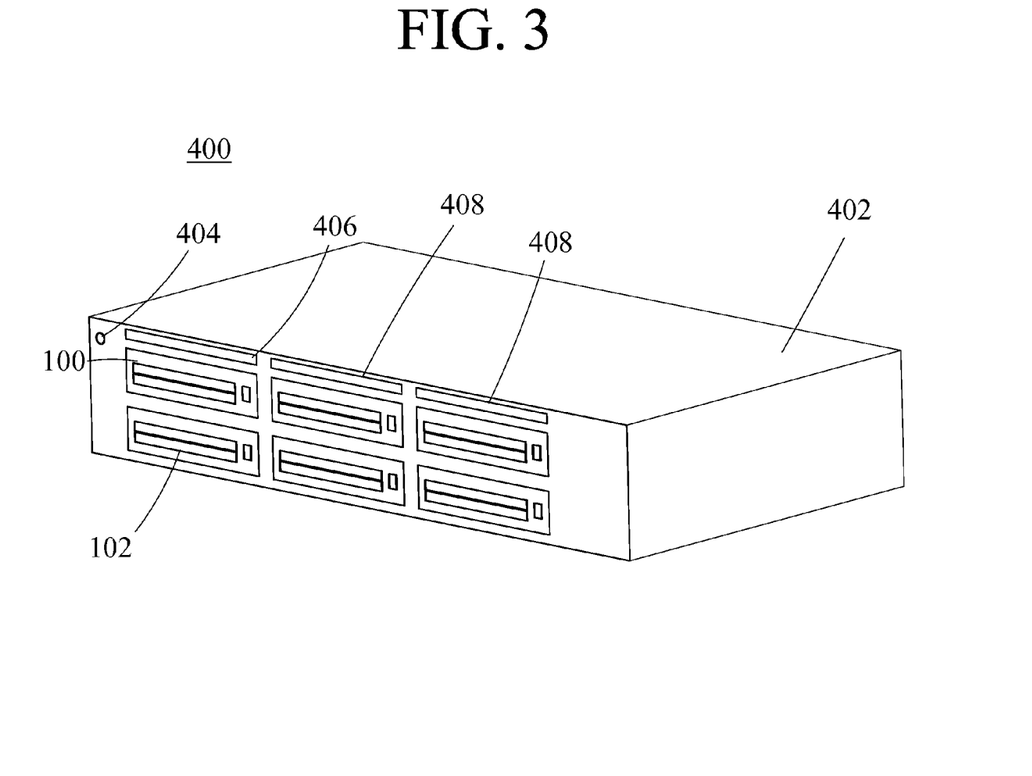
FIG. 3 is a perspective view of the server of the present invention.
Figure 4:
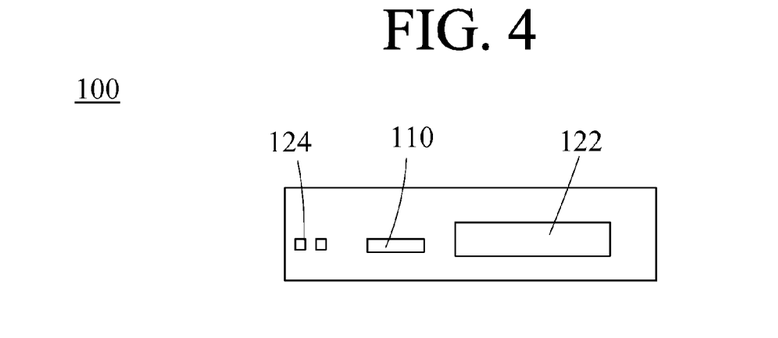
FIG. 4 is a plan view of the device of the present invention.

Turning now to FIGS. 3 and 4, the present invention further includes a rackmount server 400 bearing multiple storage devices 100. The server 400 includes a server body 402 with multiple device slots 410 dimensioned to accept the storage devices 100. The embodiment of the storage device 100 adapted for use with the rackmount server 400 includes direct current contact points 124 rather than use of a direct current plug outlet. The preferred rackmount server 400 includes an optical drive 406 and multiple 2.5" SATA hard drives for the operation of the server itself. Any drive 102 within the rackmount server 400 may be removed and still be capable of backing up any number of servers on a local area network. The software that that operates the device 100 is the same software that operates the server 400, and preferably includes functions such that the only physical interface required upon the drive or rackmount server body is a power indicator 404. The server 400 operates a server operating system and backup software.

Figure 6:
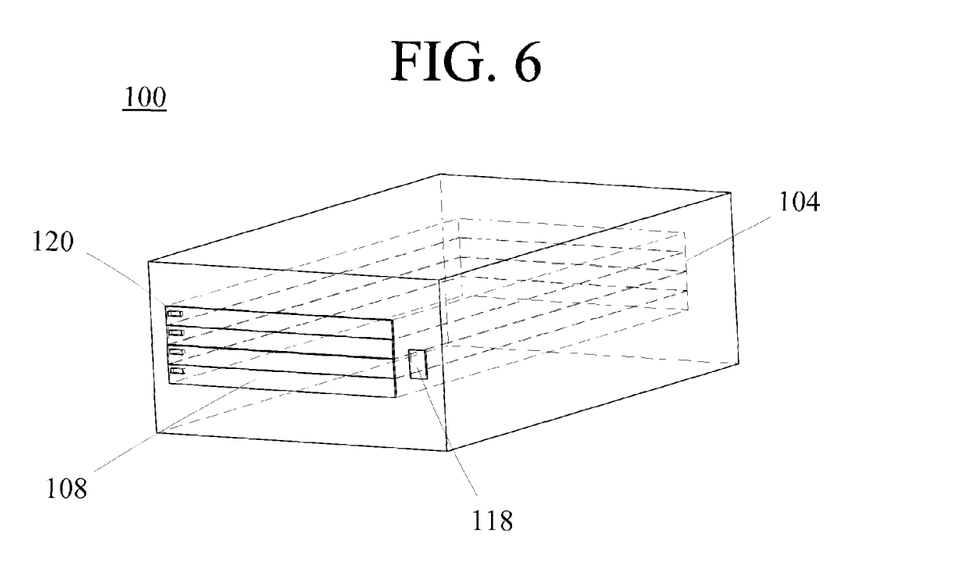
FIG. 6 is a perspective view of the device of the present invention.
Figure 7:
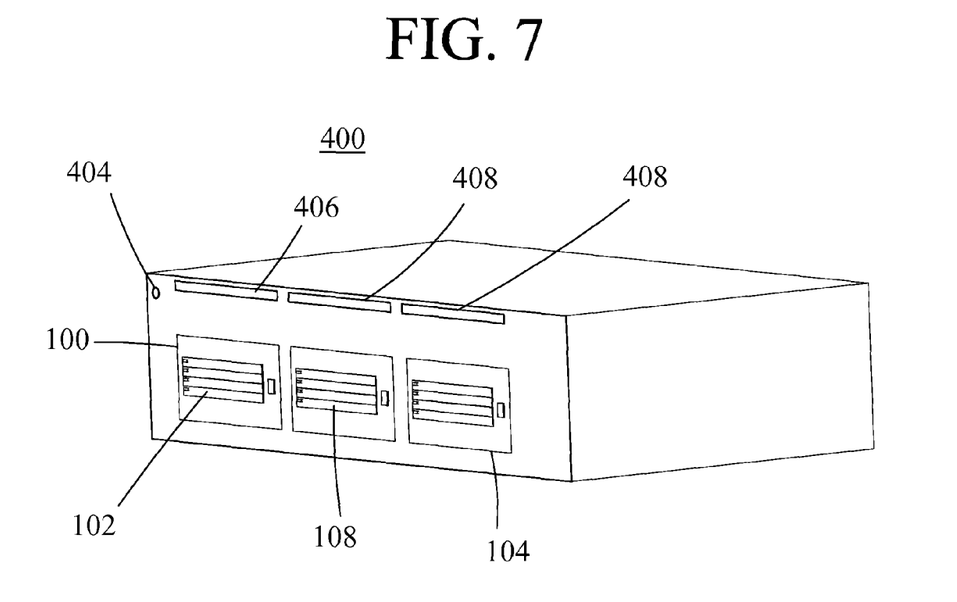
FIG. 7 is a perspective view of the server of the present invention.

Turning now to FIGS. 5-7, the present invention further includes a quad-drive embodiment of the device 100 and an embodiment of the rackmount server 400 adapted to internally support multiple quad-drive devices 100. The quad-drive may include either direct current contacts for positioning within the rackmount server 400 or a direct current plug outlet. It is preferred that the server 400 include a rechargeable power source. The preferred operation utilizes the quad-drive embodiment of the device 100 and the server 400 adapted therefor to be software configurable only. Both the device 100 and server run in RAID 5 mode only. Furthermore, the server 400 must possess at least three drives 102 therein to be configured for operation. Any other drive 102 may be part of the RAID 5 or can be a "hot spare."

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A method for initializing a RAID system, comprising:
   providing a storage device comprising at least two storage drives, wherein the storage device is in electronic communication with a computing device; and
   sending, from a processor of the storage device to the computing device, a recognition token identifying the storage device.

2. The method of claim 1, wherein the step of sending the recognition token is performed in response to a recognition-token request from the computing device to the processor of the storage device.

3. The method of claim 1, wherein the step of sending the recognition token includes sending a plurality of recognition tokens, wherein each recognition token identifies one of the at least two storage drives.

4. The method of claim 1, wherein the recognition token comprises a recognition parameter that identifies at last one of the storage drives as being compatible with the computing device.

5. The method of claim 1, wherein the recognition token comprises an action parameter comprising instructions for the storage device to remain dormant until receiving instructions, from the computing device, to initialize.

6. The method of claim 1, wherein the steps are carried out automatically upon placing the storage device in electronic communication with the computing device.

7. The method of claim 1, wherein the method includes receiving a communication from the computing device informing a user of the availability of at least of the storage drives.

8. The method of claim 7, wherein the communication includes a request for initiation instructions from the user.

9. The method of claim 8, wherein the communication includes a request for instructions from the user to select a configuration.

10. The method of claim 9, wherein the communication includes a request for instructions from the user to select at least one of a RAID 0 configuration, RAID 1 configuration, dual hard drive configuration, and combinations thereof.

11. A non-transitory, computer-readable storage medium comprising instructions that, when executed by a processor of a storage device comprising at least two storage drives, performs steps for initializing a RAID system, including:
    establishing communication between the processor of the storage device and an external computing device;
    sending, from the processor of the storage device to the computing device, a recognition token identifying the storage device.

12. The non-transitory, computer-readable storage medium of claim 11, wherein the step of sending the recognition token is performed in response to a recognition-token request from the computing device to the processor of the storage device.

13. The non-transitory, computer-readable storage medium of claim 11, wherein the step of sending the recognition token includes sending a plurality of recognition tokens, wherein each recognition token identifies one of the at least two storage drives.

14. The non-transitory, computer-readable storage medium of claim 11, wherein the recognition token comprises a recognition parameter that identifies at last one of the storage drives as being compatible with the computing device.

15. The non-transitory, computer-readable storage medium of claim 11, wherein the recognition token comprises an action parameter comprising instructions for the storage device to remain dormant until receiving instructions, from the computing device, to initialize.

16. The non-transitory, computer-readable storage medium of claim 11, wherein the steps are carried out automatically upon placing the storage device in electronic communication with the computing device.

17. The non-transitory, computer-readable storage medium of claim 11, further comprising receiving, at the processor of the storage device, a communication from the computing device informing a user of the availability of at least of the storage drives.

18. The non-transitory, computer-readable storage medium of claim 17, wherein the communication includes a request for initiation instructions from the user.

19. The non-transitory, computer-readable storage medium of claim 18, wherein the communication includes a request for instructions from the user to select a configuration.

20. The non-transitory, computer-readable storage medium of claim 19, wherein the communication includes a request for instructions from the user to select at least one of a RAID 0 configuration, RAID 1 configuration, dual hard drive configuration, and combinations thereof.

* * * * *